Patented Dec. 23, 1924.

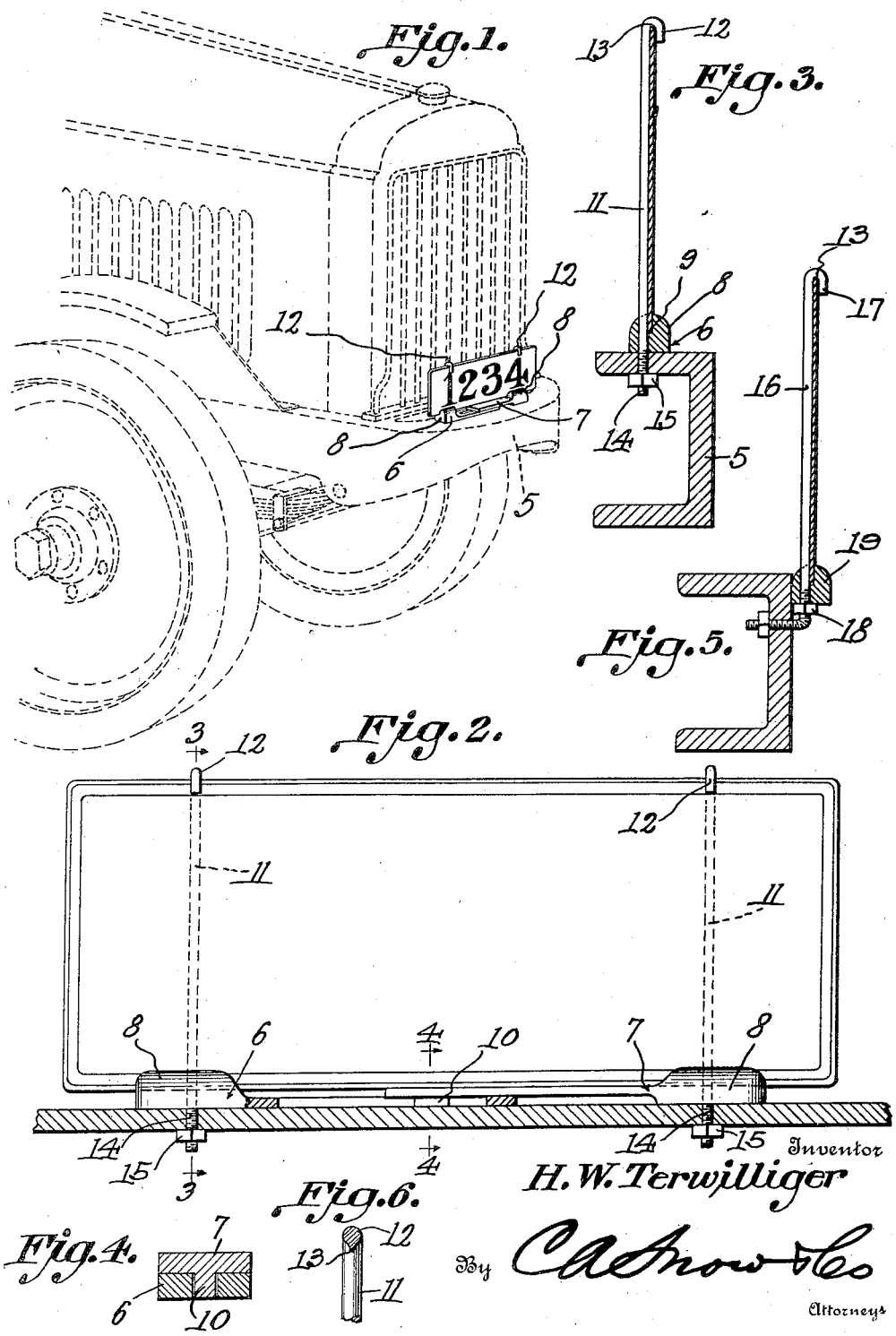

1,520,455

UNITED STATES PATENT OFFICE.

HARRY WILSON TERWILLIGER, OF ALTOONA, PENNSYLVANIA.

LICENSE BRACKET.

Application filed August 29, 1924. Serial No. 735,016.

*To all whom it may concern:*

Be it known that I, HARRY W. TERWILLIGER, a citizen of the United States, residing at Altoona, in the county of Blair and State of Pennsylvania, have invented a new and useful License Bracket, of which the following is a specification.

This invention relates to license plate brackets and aims to provide a novel form of bracket especially designed for motor trucks or the like for supporting a license plate in an upright position in a manner to insure against displacement thereof.

An important object of the invention is to provide a bracket of this character which will permit of lateral adjustment thereof to adapt the device for use in supporting license plates of various lengths.

A still further object of the invention is to provide a license plate support which will securely hold a license plate in an upright position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental perspective view disclosing a bracket constructed in accordance with the invention as secured to a motor vehicle.

Figure 2 is a front elevational view thereof.

Figure 3 is a sectional view taken on line 3—3 of Figure 2.

Figure 4 is a sectional view taken on line 4—4 of Figure 2.

Figure 5 is a modified form of the invention.

Figure 6 is a transverse sectional view through one of the hook members.

Referring to the drawing in detail, the motor truck to which the bracket is applied, is provided with a forward bar 5 which forms a part of the usual motor truck construction.

The bracket in its preferred form includes opposed sections 6 and 7 respectively, which sections are formed with enlargements 8 that are provided with slots 9 to receive portions of the lower edge of the license plate supported therein.

The section 6 is provided with an elongated opening in which the rib may move, the rib 10 carried by the section 7, being designed to restrict lateral movement of one section with respect to the other section. An opening extends through each of the enlargements 8, which openings register with suitable openings formed in the bar 5 of the truck to accommodate the securing rods 11 formed with hook portions 12 at their upper ends, which hook portions have knife-like edges 13 formed therein to cut into the upper edge of the license plate positioned under the hook members.

As clearly illustrated by Figure 3 of the drawing, the rods 11 are formed with threaded lower extremities 14 that accommodate the nuts 15 so that the rods may be drawn into close engagement with the license plate to hold the license plate within the slots 9.

In the form of the invention as illustrated by Figure 5 of the drawing, the rods 16 are provided with hook portions 17 at their upper ends, the lower ends of the rods being extended at right angles and threaded whereby the same may be positioned in openings formed in the front walls of the usual bracing bar forming a part of the motor truck construction.

In order that the license plate will be held securely within the bracket, nuts 18 are provided and engage under the enlargements 19 of the support for holding a license plate in position.

From the foregoing, it will be obvious that due to this construction, a license bracket is provided which license bracket may be adjusted to adapt it for use in connection with license plates of various sizes.

I claim:—

1. A license plate bracket including opposed sections, one of said sections having an elongated opening, the opposite section having a rib disposed in the opening to permit of lateral adjustment of the sections with respect to each other, and securing rods having hooks at their upper ends, and having connection with the sections for securing the sections to a motor vehicle frame.

2. A license plate bracket including opposed sections, said sections having slots to receive the lower edge of a license plate, securing rods having hooks, extending through the respective sections for securing the sections to the frame of a motor vehicle, and said hook members having knife-like portions adapted to bite into the upper edge of a license plate.

3. In a license plate holder, a pair of laterally adjustable supporting members having slots in their upper surfaces, said slots adapted to accommodate the lower edge of a license plate, securing rods having hooks embracing portions of the license plate, and said rods adapted to extend through the supporting members to secure the supporting members to the frame of a motor vehicle.

In testimony that I claim the foregoing as my own, I have hereto affixed my signature in the presence of two witnesses.

HARRY WILSON TERWILLIGER.

Witnesses:
R. O. NEGLEY,
W. J. DEGENHARDT.